United States Patent [19]

Hancock et al.

[11] Patent Number: 5,360,600
[45] Date of Patent: Nov. 1, 1994

[54] TREATMENT OF MINERAL AND ALKALI METAL CARBONATE SLURRIES

[75] Inventors: Bill A. Hancock; Shane D. Fleming, both of Farmington, Utah

[73] Assignee: Cytec Technology Corp., Wilmington, Del.

[21] Appl. No.: 114,863

[22] Filed: Sep. 2, 1993

[51] Int. Cl.5 .................. C01D 7/26; B03D 3/06; B01D 21/01
[52] U.S. Cl. .................. 423/184; 423/206.2; 23/302 T; 209/5; 210/734; 210/735
[58] Field of Search .............. 423/206.2, 184; 23/302 T; 209/5; 210/734, 735

[56] References Cited

U.S. PATENT DOCUMENTS

| | | | |
|---|---|---|---|
| 2,770,524 | 11/1956 | Seaton et al. | 23/302 T |
| 3,233,983 | 2/1966 | Bauer et al. | 423/206.2 |
| 3,248,353 | 4/1966 | Coscia et al. | 260/29.2 |
| 3,979,348 | 9/1976 | Ballweber et al. | 260/29.4 |
| 4,767,540 | 8/1988 | Spitzer et al. | 210/728 |
| 4,902,751 | 2/1990 | Lewellyn et al. | 525/340 |
| 5,093,091 | 3/1992 | Danplaise et al. | 423/122 |
| 5,133,874 | 7/1992 | Spitzer et al. | 210/734 |

*Primary Examiner*—Michael Lewis
*Assistant Examiner*—Steven Bos
*Attorney, Agent, or Firm*—Frank M. Van Riet

[57] ABSTRACT

The present invention provides a process for recovering alkali carbonates such as alkali sesquicarbonates from slurries of minerals such as Trona which contain those carbonates as well as clays and shales. The invention further provides a method for recovering alkaline earth carbonates from caustic slurries of those carbonates, as well as to clarifying the supernatant liquids which result from recovery of the alkaline earth carbonates.

7 Claims, No Drawings

TREATMENT OF MINERAL AND ALKALI METAL CARBONATE SLURRIES

FIELD OF THE INVENTION

The invention generally relates to methods for recovering alkali metal carbonates such as sodium carbonate and bicarbonate from minerals containing those carbonates in combination with clays and shales. The invention further relates to precipitating alkaline earth carbonates from caustic slurries of those carbonates and to clarifying the resulting supernatant liquids.

BACKGROUND OF THE INVENTION

Trona is an ore which contains sodium carbonates and sodium bicarbonates, collectively referred to as sodium sesquicarbonates. In Trona, sodium sesquicarbonates typically are found with clays, shales, and the like. Separation and removal of clays, shales and the like is necessary to provide the sought after sodium sesquicarbonates.

Flocculating clays and shales from Trona typically has been performed in the prior art by either the monohydrate slurry method or the sesquicarbonate method. The monohydrate slurry method entails calcining Trona at 200°–400° F. to convert the sodium sesquicarbonates to sodium carbonates. Lower calcining temperatures may be employed when lower concentrations of sodium sesquicarbonate are present in the Trona. The calcined Trona containing the sodium carbonates is then dissolved in water at 25°–100° C. within a pH range of 9–11, depending on the concentration of sodium sesquicarbonates in the Trona, to provide the monohydrate slurry. The resulting monohydrate slurry is treated with a flocculating agent to flocculate solids such as clays, shales and the like from the slurry to provide a supernatant solution of sodium carbonate. The sodium carbonates then are precipitated from the supernatant solution and heated to yield dry sodium carbonate.

In the sesquicarbonate process, Trona typically is dissolved in water at a temperature of about 200° F. and at a pH of 9–11. A flocculating agent is added to precipitate solids such as clays and shales to yield a clarified supernatant liquid of sodium sesquicarbonate. The supernatant solution of sodium sesquicarbonates is cooled to precipitate sodium sesquicarbonates which are calcined to yield sodium carbonates.

Various flocculating agents have been employed to flocculate clays, shales, etc. from slurries of Trona. Synthetic polymers such as acrylamide polymers typically have been used as flocculating agents. Saccharides such as guar gum also have been used to flocculate clays and shales. Flocculating agents such as guar gum, however, tend to provide low rates of flocculation. Guar gum, moreover, is expensive.

A need therefore exists for an inexpensive method of providing high rates of settling of solids such as clays and shales from mineral slurries such as Trona slurries.

Conventional flocculating agents such as copolymers of acrylamides and acrylates also have been employed to flocculate alkaline earth carbonates from caustic slurries such as slurries containing slaked lime and sodium carbonate. These copolymers, however, tend to produce low rates of precipitation of alkaline earth carbonates. Also, the clarities of supernatant liquids that result from precipitation of the alkaline earth carbonates tend to be low, indicating that substantial quantities of alkaline earth carbonates remain in the supernatant solution. The supernatant liquid that results from flocculation of the alkaline earth carbonates, moreover, often includes coloration impurities such as iron, humic acid and organic materials. Elimination of these coloration impurities is desirable because these impurities reduce the quality of the alkaline earth carbonates precipitated from the supernatant solution.

A need therefore exists for methods to efficiently and effectively precipitate alkaline earth carbonates from caustic solutions. A further need exists for methods of reducing the levels of coloration impurities in supernatant solutions of alkaline earth carbonates.

SUMMARY OF THE INVENTION

The present invention provides a process for recovering alkali metal carbonates such as sodium carbonate and sodium bicarbonate from slurries of minerals such as Trona which contain those carbonates in admixture with solids such as clays and shales. The invention further provides a method for precipitating alkaline earth carbonates from caustic slurries of those carbonates, as well as to clarifying the supernatant liquids which result from precipitating the alkaline earth carbonates.

In accordance with the invention, a method of employing hydroxamated acrylamide polymers (hereinafter called "HXPAMS") to recover alkali metal carbonates such as sodium carbonates from aqueous slurries of minerals such as Trona which contain solids such as clays, shales and the like, and alkali sesquicarbonates, is provided. The method entails adding HXPAMS to an aqueous slurry of Trona in an amount sufficient to flocculate the solids from the slurry to provide a supernatant liquid containing alkali sesquicarbonates. The alkali sesquicarbonates are precipitated from the supernatant liquid by known methods such as cooling. The precipitated sesquicarbonates then are heated to a temperature sufficient to convert the sodium sesquicarbonates to sodium carbonates. The amount of HXPAMS added to the slurry ranges from about 1–10,000 ppm per ton of Trona slurry, preferably from about 1–1,000 ppm of HXPAMS per ton of Trona slurry. HXPAMS may be employed in admixture with an additional flocculant, preferably polydiallyldimethyl ammonium chloride ("polyDADM"). The additional flocculant is employed in a sufficient amount to provide a ratio of the additional flocculant to HXPAMS of from about 10:1 to 1:10, preferably a ratio of about 5:1 to 1:5. Other flocculants which may be used in place of the polyDADM include polyamines such as those produced by reacting alkylamines with epichlorohydrin, see U.S. Pat. No. 3,248,353; cationics such as those containing Mannich groups, see U.S. Pat. No. 3,979,348, quaternaries such as those produced from monomers having the formula $CH_2=C(R)CONR^1NR^2R^3$ wherein R is hydrogen or methyl, $R^1$ is a straight or branched chain $C_2$–$C_8$ alkylene group and $R^2$ and $R^3$ are independently $C_{1-4}$ alkyl radicals, see U.S. Pat. No. 5,133,874, etc.

In another aspect of the invention, a method of employing HXPAMS to precipitate alkaline earth metal carbonates from caustic slurries containing those carbonates is provided. The method comprises adding HXPAMS to a caustic slurry comprising the alkaline earth metal carbonates in an amount sufficient to precipitate alkaline earth metal carbonates from the slurry and to yield a supernatant liquid containing those carbonates. Alkaline earth metal carbonates which may be precipitated include magnesium carbonate, beryllium carbonate, strontium carbonate, barium carbonate, and radium carbonate, mixtures thereof. Preferably calcium carbonate is precipitated from a caustic slurry having an alkali concentration of about 3–25%, preferably about, 8–15%, by weight.

DETAILED DESCRIPTION OF THE INVENTION

In accordance with the invention, HXPAMS can be added to an aqueous Trona slurry over a broad range of temperatures and pH levels. The amount of HXPAMS added depends on the amount of solids such as clays, shales and the like in the Trona slurry, as well as the temperature and pH of the slurry. HXPAMS having a hydroxamation level of about 10–40 mole percent are particularly useful in the invention. These HXPAMS are taught in and can be made by processes disclosed in U.S. Pat. No. 4,767,540 and U.S. Pat. No. 4,902,751, the teachings of which are incorporated in their entirety by reference. Generally, homopolymers of an acrylamide or copolymers of an acrylamide and such monomers as acrylic acid, sodium acrylate etc. may be hydroxamated to produce the hydroxamated polymers employed in the instant invention.

Generally, about 1–10,000 ppm of HXPAMS per ton of Trona slurry will effectively flocculate substantially all of the clays, shales and the like from the Trona slurry. Typically about 1–1,000 ppm of HXPAMS per ton of Trona slurry can be used. The slurries generally comprise from about 1 to about 50% solids, preferably from about 5 to about 35%, by weight.

The invention will now be described by reference to the following non-limiting examples. All percentages are by weight unless otherwise noted.

The effectiveness of HXPAMS for flocculating solids such as clays, shales and the like from aqueous Trona slurries is gauged by measuring the rate of sedimentation of solids from a given volume of Trona slurry by the cylinder settling test. The effectiveness of HXPAMS as a flocculant also can be evaluated by gauging the clarity of the supernatant liquid resulting from flocculation of solids, i.e., greater clarities in the resulting supernatant liquid is measured by visual comparison with samples of aqueous Trona slurry which have not been treated with flocculant.

Addition of the HXPAM, as shown in TABLE 1, provides surprisingly high rates of settling of solids even when employed in very low dosages.

As shown in Table 1, when the HXPAM is added in very small dosages of 4.0–9.4 ppm on an active basis of the HXPAM, high settling rates of 1.5–3.9 inch/minute are achieved. A wide range of dosages of HXPAMS other than those of Table 1, however, may be employed depending upon the specific types of clays, shales and the like in the Trona slurry, the temperature of the slurry, as well as the pH off the slurry. Specific dosage amounts of the HXPAM therefore readily may be determined by those skilled in the art.

For comparison of the settling rates provided by the HXPAM to commercially available flocculants, the rate of settling of solids generated by addition of commercially available guar gum is measured. The rate of settling of solids from aqueous Trona slurties provided by guar gum is measured by adding 40 ppm doses of guar gum to the aqueous monohydrate Trona slurry. The rate of settling achieved by 40 ppm dose of guar gum is 0.7–1.0 inch/minute. By comparison, dosages of the HXPAM of as little as 4.0 ppm provide a much higher settling rate of 1.5 inch/minute.

In an alternative embodiment of the invention, as illustrated in Examples 4–6, an HXPAM is combined with an additional flocculant to further increase the extent of settling of solids as well as to yield supernatant liquids with further improved levels of clarity. Accordingly, the additional flocculant is combined with the HXPAM prior to adding to the aqueous Trona slurry.

EXAMPLES 4–6

An HXPAM is admixed with an additional flocculant by well known procedures. The relative proportions of the additional flocculant, poly(DADM), and the HXPAM in the combined flocculant are shown in Table 1. The resulting, combined flocculant is added to the slurry as described in Example 3. The results are shown in Table 1.

TABLE 1

| Example | Flocculant(s) | Dose (ppm) | Setting Rate (inch/minute) | Clarity |
| --- | --- | --- | --- | --- |
| 1 | HXPAM[1] | 4.0 | 1.5 | Fair |
| 2 | HXPAM[1]* | 5.4 | 2.7 | Fair |
| 3 | HXPAM[1]* | 9.4 | 3.9 | Fair |
| 4 | HXPAM[1]/DADM** | 9.4/20.0 | 3.9 | Excellent |
| 5 | DADM/HXPAM1[1]*,[2] | 20.0/5.4 | 1.7 | Good |
| 6 | DADM/HXPAM[1]*,[2] | 40.0/5.4 | 0.2 | Excellent |

[1]Molecular weight = 10–15 million
% hydroxamation = 45%
*Inverted cylinder five times instead of three times
**Reflocculated the slurry of Example 3 with DADM.
[2]Poly(DADM)-M.W. about 500,000 supernatant liquid indicate a greater efficiency of flocculation of solids.

EXAMPLES 1–3

500 ml samples of aqueous monohydrate Trona slurry at 140° F. are each placed into a graduated vessel. The vessel is inverted three times to uniformly mix the slurry. An HXPAM is added to the slurry whereupon the vessel is inverted three times to uniformly mix and condition the slurry with the HXPAM. The rate of settling of solids is monitored by periodically marking the mud line on the side of the vessel. The clarity of the As indicated, an admixture of the HXPAM and additional flocculant can be added to the Trona slurry. Alternatively, the additional flocculant may be added either prior to or subsequent to addition of the HXPAM. The ratio of the additional flocculant to the HXPAM can vary over a wide range, typically from 10:1 to 1:10, preferably 5:1 to 1:5.

In another aspect of the invention, an HXPAM is used to flocculate alkaline earth metal carbonates from caustic aqueous solutions of those carbonates. Alkaline earth metal carbonates which may be flocculated by the HXPAMS include magnesium, beryllium, strontium, barium, and radium carbonates, as well as mixtures thereof, preferably, calcium carbonate. Caustic slurries of the alkaline earth metal carbonate are made by known methods. For example, aqueous caustic slurries of calcium carbonate can be produced by reacting calcium hydroxide with sodium carbonate to yield sodium hydroxide, calcium carbonate and water.

After the alkaline earth metal carbonate solids have been flocculated from the caustic slurry, the residual supernatant liquid can be treated by known processes such as polish clarification to improve further the clarity of the supernatant. The alkaline earth metal carbonates which are flocculated from caustic slurries by the HXPAM can be recovered by known processes such. as counter current decantation, filtration processes, centrifugation, screw presses, etc.

EXAMPLES 7-15

Polymeric flocculant is added to a caustic slurry of $CaCO_3$ by adding a dose of polymer to 950 ml of the caustic slurry of $CaCO_3$ contained in a graduated cylinder. Prior to addition, a 6.0 ml dose of polymer, at 0.1% concentration on an active polymer basis, is diluted by distilled water to yield a total volume of diluted polymer solution of 50 ml. The 50 ml volume of the diluted polymer is added in two 25 ml portions. Just prior to adding the first 25 ml portion of the diluted polymer to the caustic slurry, the 950 ml volume of the caustic slurry in the graduated cylinder is agitated by inverting the cylinder and returning it to its upright position five times. The first 25 ml portion of the diluted polymer then is added to the caustic slurry. The cylinder again is inverted and returned to its upright position three times to thoroughly mix the 25 ml portion of polymer with the slurry. The remaining 25 ml of diluted polymer then is added to the slurry. The cylinder again is inverted and returned to its upright position three times. The rate at which the calcium carbonate is flocculated is monitored by recording the mudline of the flocculated $CaCO_3$. The results are shown in Table 2.

To illustrate the surprising ability of an HXPAM to flocculate alkaline earth carbonates such as calcium carbonates from caustic solutions, the rate of settling of calcium carbonate from a caustic slurry containing calcium carbonates having a total solids of 10.1% and total alkalinity of 11.4% $NaOH+0.33\%$ $Na_2CO_3$, by addition of the HXPAM is compared with the rate of settling achieved by known copolymers of polyacrylamides and acrylates.

Polymer A is used to flocculate calcium carbonate from caustic slurties having 8-15% caustic concentrations. Polymer A is diluted as described above for the HXPAM. The diluted flocculants are added to the caustic slurry as described above for the HXPAM. The results are shown in Table 3.

TABLE 2

| Example | Flocculant | Flocculant Dose (ml) | Flocculant Std viscosity in mPa · s | HXPAM % Hydroxamation | Settling Rate (inches/min) | Clarity/Flocculation Response |
| --- | --- | --- | --- | --- | --- | --- |
| 7* | Polymer A | 6 | — | — | 3.9 | Poor/Suspended Solids |
| 8 | HXPAM | 6 | 10-11 | 20 | 3.4 | Very Good/Large Floccs |
| 9* | Polymer A | 6 | — | — | 4.6 | Good but with Suspended Fine Solids |
| 10* | Polymer C | 6 | 10 | 0 | 4.1 | Poor/Indistinct Mud Line |
| 11* | Polymer A | 6 | — | — | 3.9 | Fair to Good |
| 12* | Polymer D | 6 | 9.5 | 0 | 2.9 | Poor/Indistinct Mud Line |
| 13* | Polymer B | 6 | — | — | 3.8 | Good |
| 14* | Polymer A | 6 | — | — | 3.6 | Poor to Fair |
| 15 | HXPAM | 6 | 10-11 | 10 | 4.7 | Very Good/Large Floccs |

Polymer A = Commercial polyacrylate
Polymer B = Commercial high molecular weight ammonium polyacrylate polymer
Polymer C = Acrylamide: sodium acrylate copolymer - 60% charge
Polymer D = Acrylamide: sodium acrylate copolymer - 30% charge
* = Comparative The clarities of the supernatant liquids which result from treatment of caustic slurries of calcium carbonate having a low percent alkalinity also are highly surprising. This is illustrated in Examples 16-22.

EXAMPLES 16-18

Using the caustic slurry and mixing procedures of Example 8, an HXPAM is added to flocculate $CaCO_3$ solids. The clarities of the resulting supernatant liquid are shown in Table 3. In comparison, the clarity of the supernatant that results from treatment of that caustic $CaCO_3$ slurry with conventional high ionic charged acrylamide/acrylate copolymers such as Polymer A, as performed in accordance with Example 7, is poor.

EXAMPLES 19-22

Using the mixing procedure of Example 7, an HXPAM is added to a caustic slurry of calcium carbonate having total solids of 10.6%, and total alkalinity of 1.68% $Na_2CO_3+11.23\%$ NaOH. The results are shown in Table 4.

In comparison, conventional high ionic charged flocculants such as Polymer B do not yield as good results. This is illustrated in Example 22 wherein Polymer B is added in accordance with the mixing procedures of Example 7 to the above caustic slurry. The result is shown in Table 4.

TABLE 3

| Example | Flocculant | Flocculant Dose (ml) | Flocculant Std viscosity | HXPAM % Hydroxamation | Settling Rate (inches/ min) | Supernatant Clarity/Flocculation Response |
|---|---|---|---|---|---|---|
| 16 | HXPAM | 4 | 10–11 | 10 | 4.4 | Clear Supernatant and Large Floccs |
| 17 | HXPAM | 4 | 10–11 | 20 | 3.0 | Clear Supernatant and Large Floccs |
| 18* | Polymer A | 4 | — | — | 3.6 | Fair–Good Clarity and Medium Floccs |

* = Comparative

TABLE 4

| Example | Flocculant | Flocculant Dose (ml) | Flocculant Std viscosity | HXPAM % Hydroxamation | Settling Rate (inches/ min) | Supernatant Clarity and Flocculation Response |
|---|---|---|---|---|---|---|
| 19 | HXPAM | 8 | 10–11 | 20 | 3.6 | Clear Supernatant and Large Floccs |
| 20 | HXPAM | 8 | 10–11 | 10 | 4.6 | Clear Supernatant and Large Floccs |
| 21* | Polymer A | 8 | — | — | 4.0 | Good and Medium Floccs |
| 22* | Polymer B | 8 | — | — | 3.9 | Moderate Supernatant Clarity and Medium Floccs |

* = Comparative

In accordance with another aspect of the invention as illustrated in Examples 23–27, it is found that the HXPAMS can remove residual iron and other coloring constituents remaining in the supernatant liquids which result from flocculation of the alkaline earth carbonates. results are inversely related to color, i.e., lower color number shows improved color. The coloration of the treated supernatant liquids, as shown in Table 5, demonstrate the effectiveness of HXPAM for removing coloration agents.

TABLE 5

| Example | Flocculant | HXPAM Flocculant Addition ml | Conc (%) of HXPAM | HXPAM Molecular Weight | HXPAM % Hydroxamation | Color Reading | Iron Concentration ppm |
|---|---|---|---|---|---|---|---|
|  | None | — | — | — | — | 17 | 7.9 |
| 23 | HXPAM | .5 | 100 | 100–200K | 40 | 12 | 7.8 |
| 24 | HXPAM | .5 | 100 | 100–200K | 30 | 12 | 7.5 |
| 25 | HXPAM | 50 | 1.0 | 100–200K | 20 | 30+ | 2.7 |
| 26 | HXPAM | 50 | 1.0 | 100–200K | 60 | 30+/19* | 1.2 |
| 27 | HXPAM | 50 | 1.0 | 100–200K | 30 | 30+/20** | 1.0 |

*Carbon treated first filtrate (1st reading) refiltered to obtain second reading.
**Treated first filtrate with 3 ml of 2% polydiallyldimethyl ammonium chloride and refiltered to get second reading. Post floccule formation after sample was allowed to stand and was filtered away, and the filtrate analyzed for iron content.

Use of an HXPAM to remove the coloring constituents is beneficial since coloring constituents such as dissolved iron, humic acid and the like tend to degrade the alkaline earth carbonates precipitated from supernatant liquid.

EXAMPLES 23–27

200 ml samples of 50% caustic solutions of calcium carbonate are mixed in a beaker with a magnetic stirrer. The caustic solutions are maintained at 140° F. while the solutions are stirred for three minutes. An HXPAM is added to precipitate calcium carbonate solids. The resulting supernatant solution is filtrated on a Buchner funnel. The filtered solutions are allowed to stand and cool for several hours.

The resulting coloration of the supernatant liquid is determined on filtered solutions by quantitative comparison to color standards. The concentration of impurities such as iron in the treated supernatant liquid are analyzed by known methods. Quantitative coloration From the foregoing description, one skilled in the art can easily ascertain the essential characteristics of this invention, and without departing from the spirit and scope thereof, can make various changes and modifications of the invention to adapt it to various usages and conditions.

We claim:

1. A method of recovering alkali metal carbonates from a slurry having minerals and alkali metal sesquicarbonates therein comprising,
   adding a hydroxamated acrylamide polymer to said slurry in an amount sufficient to flocculate said minerals from said slurry to provide a supernatant liquid containing alkali metal sesquicarbonates,
   treating said liquid to precipitate said sesquicarbonates, and
   treating said sesquicarbonates to yield alkali metal carbonates.

2. The method of claim 1 wherein said minerals are selected from the group of clays, shales and mixtures thereof.

3. The method of claim 1 wherein said treating of said liquid is performed by cooling said liquid to precipitate said sesquicarbonates.

4. The method of claim 1 wherein said amount is about 1–10,000 ppm of said polymer.

5. The method of claim 1 wherein said polymer is used in admixture with an additional flocculant.

6. The method of claim 5 wherein said additional flocculant is polydiallyldimethylammonium chloride.

7. The method of claim 1 wherein said polymer has a hydroxamation level of 10–40 mole percent.

* * * * *